(12) United States Patent
Boiarciuc

(10) Patent No.: US 11,879,376 B2
(45) Date of Patent: Jan. 23, 2024

(54) CONTROL METHOD FOR MOTOR VEHICLE WITH ELECTRICALLY HEATED COMBUSTION GAS TREATMENT DEVICE

(71) Applicant: Nissan Motor Co., Ltd., Yokohama (JP)

(72) Inventor: Andrei-Alexandru Boiarciuc, Montigny le Bretonneux (FR)

(73) Assignee: Nissan Motor Co., Ltd., Yokohama (JP)

( * ) Notice: Subject to any disclaimer, the term of this patent is extended or adjusted under 35 U.S.C. 154(b) by 458 days.

(21) Appl. No.: 17/285,970

(22) PCT Filed: Nov. 25, 2019

(86) PCT No.: PCT/EP2019/082361
§ 371 (c)(1),
(2) Date: Apr. 16, 2021

(87) PCT Pub. No.: WO2020/109204
PCT Pub. Date: Jun. 4, 2020

(65) Prior Publication Data
US 2021/0339734 A1    Nov. 4, 2021

(30) Foreign Application Priority Data

Nov. 27, 2018 (FR) ...................... 1871888

(51) Int. Cl.
*F01N 9/00*   (2006.01)
*B60W 10/06*  (2006.01)
(Continued)

(52) U.S. Cl.
CPC .............. *F01N 9/00* (2013.01); *B60W 10/06* (2013.01); *F01N 3/2013* (2013.01);
(Continued)

(58) Field of Classification Search
CPC .............. B60W 10/06; B60W 2540/10; F01N 2240/16; F01N 2260/08; F01N 2430/02;
(Continued)

(56) References Cited

U.S. PATENT DOCUMENTS 5,357,752 A   10/1994 Lucchesi
5,492,190 A * 2/1996 Yoshida ................ B60W 10/06
                                         180/65.245
(Continued)

FOREIGN PATENT DOCUMENTS

JP   2003227366 A  *  8/2003
JP   2009-35117 A      2/2009

OTHER PUBLICATIONS

Japanese Office Action dated Oct. 10, 2023 of corresponding Japanese Patent Application No. 2021-529301.

*Primary Examiner* — Jesse S Bogue
(74) *Attorney, Agent, or Firm* — Global IP Counselors, LLP

(57) ABSTRACT

A control method is performed to control a traction device of a motor vehicle having an internal combustion engine that includes a plurality of cylinders. Each of cylinders has at least one air intake valve, at least one exhaust valve for the combustion gases generated by the internal combustion engine, and a fuel injector. A treatment device is provided for the combustion gases that is active from an actuation temperature. The treatment device is placed downstream of the exhaust valve. The traction device includes an electrical heater for heating the combustion gas treatment device. The traction method further compares a temperature of the combustion gas treatment device with an actuating threshold temperature and actuates the electrical heater and stopping a fuel supply being supplied to one or more of the cylinders as (Continued)

long as the temperature of the combustion gas treatment device is below the actuating threshold temperature.

13 Claims, 3 Drawing Sheets

(51) Int. Cl.
    *F01N 3/20*     (2006.01)
    *F02D 13/02*     (2006.01)
    *F02D 41/02*     (2006.01)
    *F02D 41/38*     (2006.01)

(52) U.S. Cl.
    CPC ..... *F02D 13/0203* (2013.01); *F02D 41/0255* (2013.01); *F02D 41/38* (2013.01); *B60W 2540/10* (2013.01); *F01N 2900/1602* (2013.01); *F02D 2200/0802* (2013.01); *F02D 2200/602* (2013.01)

(58) Field of Classification Search
    CPC ............ F01N 2430/10; F01N 2560/06; F01N 2590/11; F01N 2900/0602; F01N 2900/08; F01N 2900/10; F01N 2900/1602; F01N 2900/1626; F01N 3/2013; F01N 9/00; F02D 13/0203; F02D 2200/0802; F02D 2200/602; F02D 41/0087; F02D 41/0255; F02D 41/38; Y02A 50/20; Y02T 10/12; Y02T 10/40
    See application file for complete search history.

(56) References Cited

U.S. PATENT DOCUMENTS

| | | | |
|---|---|---|---|
| 6,018,694 A * | 1/2000 | Egami | B60W 10/26 |
| | | | 903/952 |
| 8,104,269 B2 * | 1/2012 | Gonze | F02D 41/025 |
| | | | 60/274 |
| 8,601,794 B2 * | 12/2013 | Yamato | F01N 3/2013 |
| | | | 60/275 |
| 8,756,924 B2 * | 6/2014 | Gonze | F02D 31/002 |
| | | | 60/303 |
| 9,174,625 B2 * | 11/2015 | Baum | B60W 10/06 |
| 11,199,118 B2 * | 12/2021 | Dudar | F01N 11/005 |
| 2012/0283067 A1 * | 11/2012 | Roos | B60W 30/1882 |
| | | | 477/100 |
| 2016/0121891 A1 * | 5/2016 | Kim | B60W 30/18 |
| | | | 701/96 |

\* cited by examiner

CONTROL METHOD FOR MOTOR VEHICLE WITH ELECTRICALLY HEATED COMBUSTION GAS TREATMENT DEVICE

CROSS-REFERENCE TO RELATED APPLICATIONS

This application is a U.S. national stage application of International Application No. PCT/EP2019/082361, filed on Nov. 25, 2019.

BACKGROUND

Technical Field

The present invention relates, in a general manner, to the reduction of the emissions of pollutants by a motor vehicle internal combustion engine.

More particularly, the invention relates to a method for controlling a traction device for a motor vehicle for the reduction of the emissions of pollutants by an internal combustion engine, in particular with controlled ignition or with compression ignition, and also to an associated traction device.

Background Information

By controlled-ignition engine is understood any internal combustion engine whose combustion is initiated by a spark plug in the combustion chambers of the engine, for example a petrol, alcohol, LPG or gas engine.

By compression-ignition engine is understood any internal combustion engine whose combustion is initiated by the increase in the pressure in the combustion chambers of the engine, for example a diesel engine consuming diesel fuel.

Generally, at least one combustion gas treatment device, termed catalyst or catalytic converter, is mounted at the exhaust of the engine and treats the combustion gases, such as hydrocarbons, carbon monoxides or else nitrogen oxides, emitted by the engine.

In the case of a controlled-ignition engine, for example, this can be a three-way catalyst. In the case of a compression-ignition engine, for example, this can be an oxidation catalyst.

The efficiency of the catalyst is linked with its temperature. When the catalyst is cold, that is to say at a temperature below its actuating temperature, it is not active or barely active. Consequently, the cold starting and the operation during the first seconds of the engine entail a high emission of pollutants.

An adjustment of the engine commonly used consists in degrading the efficiency of the combustion of the engine. In the case of a controlled-ignition engine, this generally consists in adjusting the advance of the engine at ignition and in thus offsetting the combustion toward the expansion of the gases, conventionally referred to as under-advance. This results in an increase in the temperature of the exhaust gases and consequently in that of the catalyst, which reaches its actuating temperature more quickly. In the case of a compression-ignition engine, the same offsetting of the combustion can generally be obtained by providing a late phase of injecting fuel into the cylinders of the engine.

However, in spite of the advantageous increase in the temperature of the catalyst, the operation with under-advance or with a retarded injection simultaneously entails engine instability, an overconsumption of fuel and especially an increase in the emission of pollutants. For example, in the case of a controlled-ignition engine, the engine requires a greater air flow and, to maintain an equivalent richness, a greater fuel flow, which results in an increase in the exhaust flow and, therefore, in the flow of emitted pollutants. In the case of a compression-ignition engine, the air flow sucked in by the engine is not generally modified, but the fuel flow necessary for producing the torque is higher, the combustion efficiency is degraded, and the emissions of pollutants are increased.

Another strategy for reducing the operation of the engine with a degraded combustion efficiency consists in equipping the traction device of the vehicle with an electrically heated catalyst in which the heating is produced by convection between a heating grid and the monolith(s) forming the catalyst.

The quality of the heat exchange between the grid and the catalyst is therefore essential for quickly reaching the actuating temperature of the catalyst.

As is described in document U.S. Pat. No. 5,357,752, one solution consists in injecting an additional air flow upstream of the catalyst through an annular space situated at the inlet of the catalyst.

However, this solution remains complex and costly since it requires the installation of additional components and the modification of the catalyst in order to install the air inlet. Moreover, it generates bulk and increases the mass of the traction device.

SUMMARY

The invention is therefore aimed at overcoming these disadvantages and proposing a method for controlling a traction device that makes it possible to promote the heating of the catalyst and to more quickly reach the actuating temperature of the catalyst without increasing the emission of pollutants.

What is therefore proposed is a method for controlling a traction device for a motor vehicle comprising an internal combustion engine, the engine comprising a plurality of cylinders each provided with at least one air intake valve, with at least one exhaust valve for the combustion gases generated by the internal combustion engine, and with a fuel injector, and a device for treating the combustion gases that is active from an actuating temperature, the treatment device being placed downstream of the exhaust valve.

In addition, the traction device comprises an electrical heating means for heating the combustion gas treatment device and a control device. The temperature of the combustion gas treatment device is compared with the actuating threshold temperature and, as long as the temperature of the combustion gas treatment device is below the threshold temperature, the heating means of the combustion gas treatment device is activated and the supply of fuel into one or more of the cylinders of the engine is cut.

Advantageously, the control device can carry out the following steps: the determination of the speed of the traction device and of the depression of an accelerator pedal; the calculation of a torque setpoint of the traction device as a function of the determined speed of the traction device and of the determined depression of the pedal; and the control of the stopping of the supply of fuel to one or more of the cylinders as a function of the calculated torque setpoint of the traction device.

Still more advantageously, the control method can comprise the control by the control device of the percentage of opening of the intake and exhaust valves of the cylinders in which the supply of fuel is cut.

According to another advantageous feature, the control method can comprise the distribution by the control device of the torque of the traction device to be supplied between an electric motor of the traction device and the controlled-ignition engine when the temperature of the treatment device is below the actuating threshold temperature.

Preferably, the control device cuts the supply of fuel in all the cylinders of the controlled-ignition engine and the whole of the torque of the traction device is supplied by the electric motor when the temperature of the treatment device is below the actuating threshold temperature.

Preferably, the control method comprises the determination by the control device of the difference between the temperature of the treatment device and the actuating threshold temperature and the distribution of the torque of the traction device to be supplied respectively by the electric motor and the internal combustion engine as a function of the determined difference.

The invention also relates to a traction device for a motor vehicle comprising an internal combustion engine, the engine comprising a plurality of cylinders each provided with at least one air intake valve, with at least one exhaust valve for the combustion gases generated by the engine, and with a fuel injector, and a treatment device for the combustion gases that is active from an actuating temperature, the treatment device being placed downstream of the exhaust valve.

In addition, the traction device comprises an electrical heating means for heating the treatment device, a temperature sensor configured to record the temperature of the treatment device and a control device configured to activate the heating means of the treatment device and to cut the supply of fuel into one or more of the cylinders of the engine as long as the temperature of the treatment device is below the actuating threshold temperature.

Preferably, the control device is configured to: determine the speed of the traction device and of the depression of an accelerator pedal; calculate a torque setpoint of the traction device as a function of the determined speed and of the determined depression; and control the stopping of the supply of fuel into one or more of the cylinders as a function of the calculated torque setpoint of the traction device.

Advantageously, the control device can be able to control the percentage of opening of the intake and exhaust valves of the cylinders in which the supply of fuel is cut.

Still more advantageously, the traction device can comprise an electric motor, the control device being configured to order the traction of the motor vehicle at least in part by an electric motor as long as the temperature of the treatment device is below the actuating threshold temperature.

Preferably, the control device is configured to cut the supply of fuel into all the cylinders of the internal combustion engine and to order the supply of the whole of the torque of the traction device by the electric motor when the temperature of the treatment device is below the actuating threshold temperature.

Preferably, the control device is configured to determine the difference between the temperature of the treatment device and the actuating threshold temperature and to determine the distribution of the torque to be supplied respectively by the electric motor and the internal combustion engine as a function of the determined difference.

The invention relates, moreover, to a motor vehicle comprising a traction device as described above.

Other aims, advantages and features will emerge from the following description given purely by way of illustration with reference to the appended drawings.

DETAILED DESCRIPTION OF EMBODIMENTS

Figure 1:
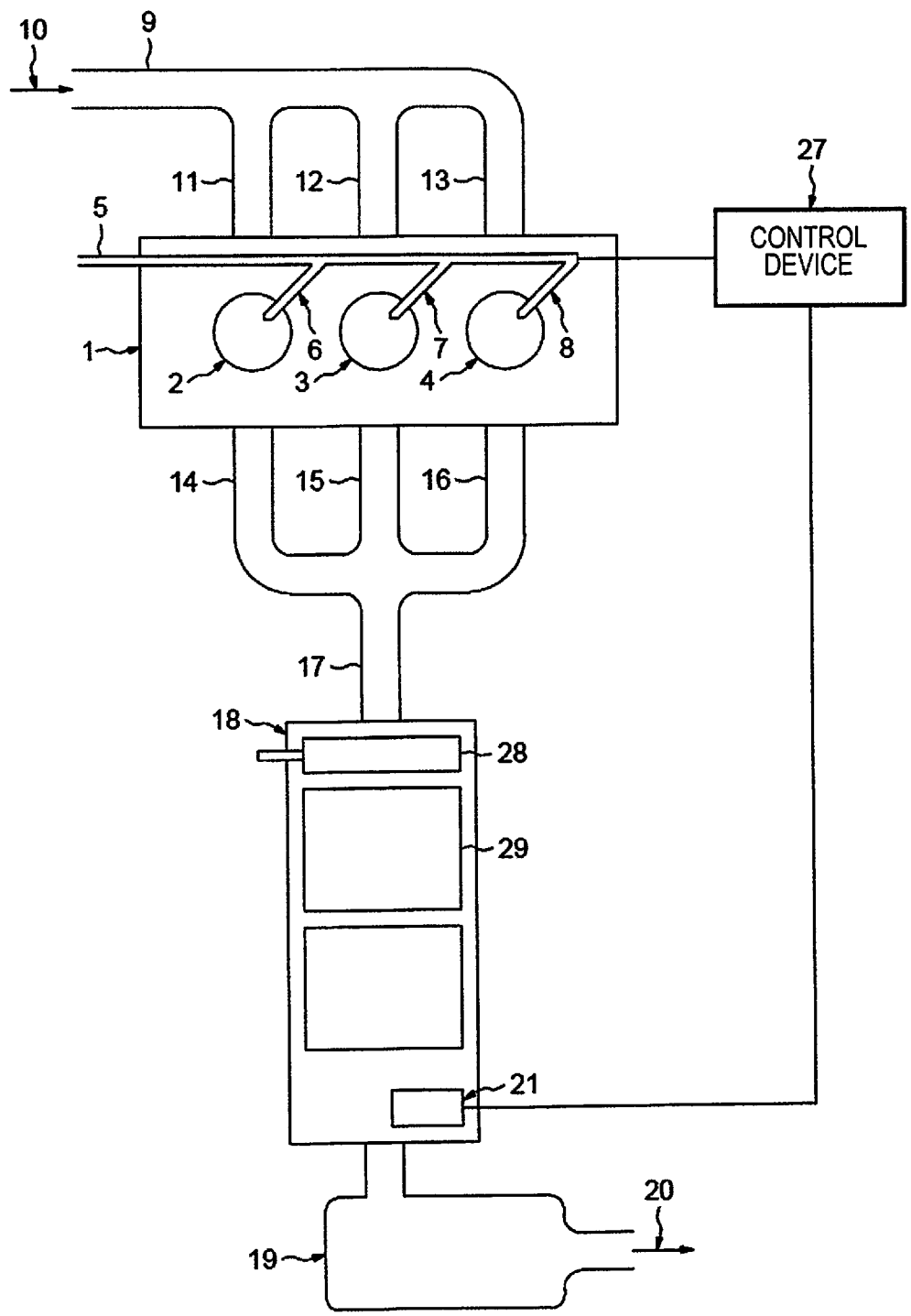
FIG. 1 schematically illustrates a traction device comprising an internal combustion engine of the controlled-ignition type connected to a treatment device for the combustion gases generated by the engine according to one embodiment of the invention.

As illustrated in FIG. 1, an internal combustion engine 1 of a traction device comprises a plurality of cylinders 2, 3 and 4. In the example illustrated, the engine 1 is provided with three cylinders 2, 3 and 4. In the example illustrated by FIG. 1, the engine is of the controlled-ignition type, but it could also be a compression-ignition engine without departing from the scope of the invention.

Each cylinder 2, 3 and 4 comprises a respective fuel injector 6, 7 and 8 which can be supplied with fuel via a duct 5, for example a fuel supply common rail 5.

A supply duct 9, supplied with air 10, advantageously opens into each cylinder 2, 3 and 4 via a respective intake duct 11, 12 and 13.

In this representation, an exhaust duct 14, 15, 16 for the combustion gases generated by the engine 1 leads from each cylinder 2, 3 and 4. The three exhaust ducts 14, 15, 16 lead toward a common duct 17 connected to a treatment device 18 for the combustion gases generated by the engine 1.

In addition, the treatment device 18, which is active from an actuating temperature, corresponds, for example, to a three-way catalyst for the simultaneous treatment of nitrogen oxide, carbon monoxide and hydrocarbon. Other types of treatment devices 18 are conceivable as a variant: for example, the device in question may be, in a nonlimiting manner, a nitrogen oxide trap. For example, if the engine is of the compression-ignition type, the device may be an oxidation catalyst. In addition, the treatment device 18 comprises means 21 for determining the temperature of the device 18, for example a temperature sensor 21. In a very common variant, what can also be involved here is a model which is for example a function of a set of operating parameters of the engine, comprising at least the speed of the engine, the torque of the engine, and a temperature of the engine cooling liquid, making it possible to obtain the temperature of the catalyst 18.

In the example illustrated, the treatment device 18 is arranged upstream of an exhaust silencer 19 intended for exhausting the gases 20 treated by the treatment device 18.

Figure 2:
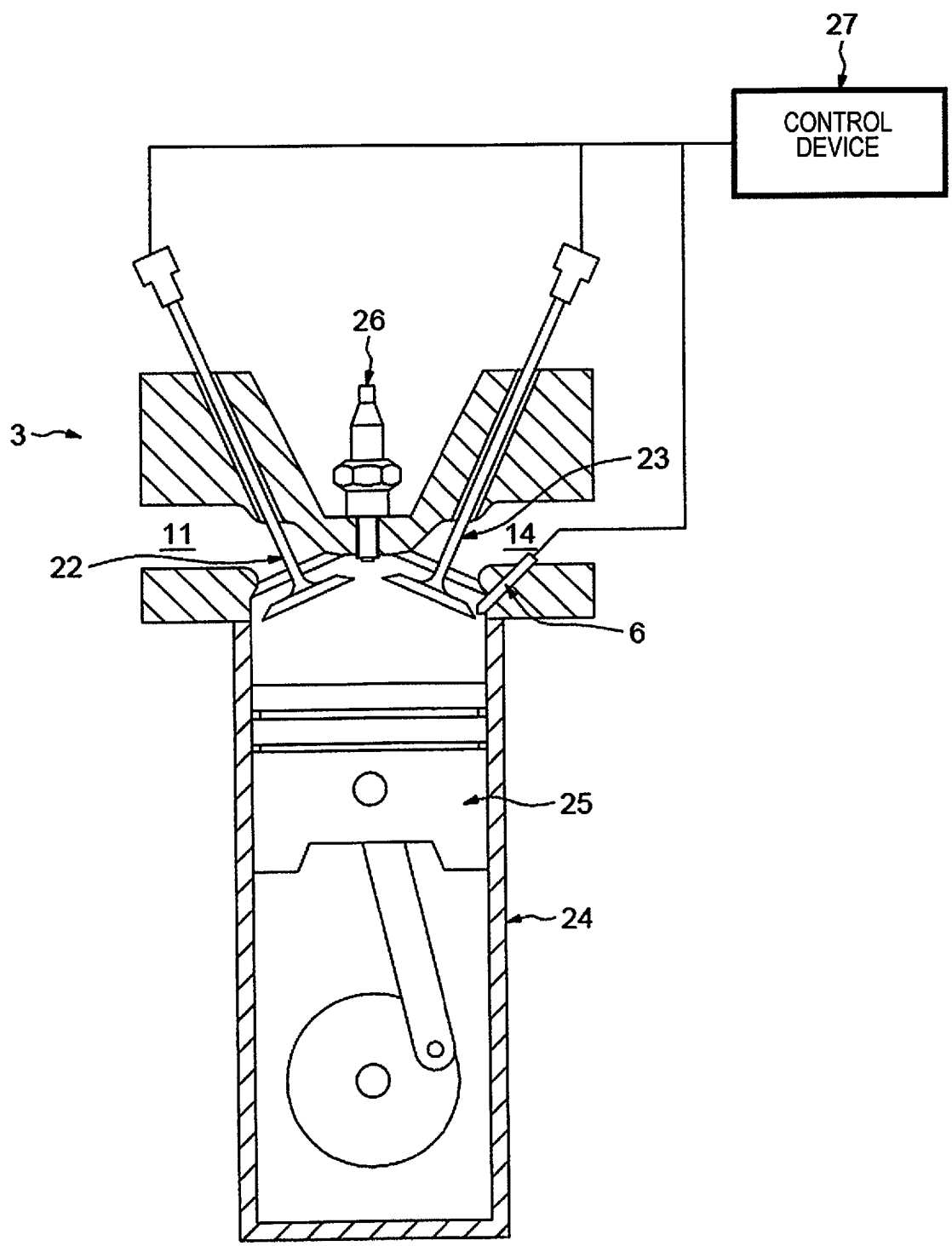
FIG. 2 is a sectional view of a cylinder of a controlled-ignition engine as illustrated in FIG. 1.
Figure 3:
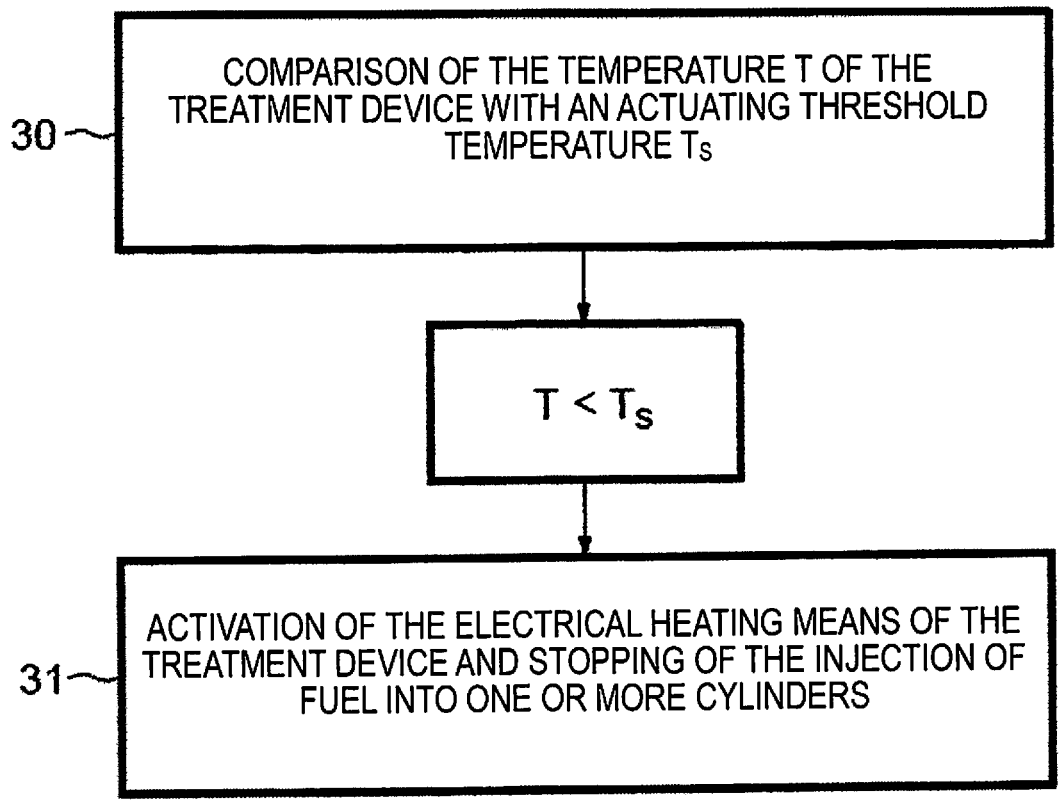
FIG. 3 illustrates a method for controlling a traction device for a motor vehicle, comprising an electrically heated combustion gas treatment device.

FIG. 2 illustrates a sectional view of one of the cylinders 2, 3, 4 of the engine 1. In the example illustrated, the three cylinders 2, 3 and 4 are configured in a similar way. The cylinder 2 represented comprises a combustion chamber 24, a piston 25 and a spark plug 26.

In addition, the cylinder 2 comprises an air intake valve 22 and an exhaust valve 23 for the combustion gases generated by the engine 1. Of course, it is conceivable for each cylinder 2, 3 and 4 to be provided with an additional intake valve 22 and with an additional exhaust valve 23. The valves 22 and 23 are represented in the open state.

As is illustrated in FIGS. 1 and 2, the fuel injectors 6, 7 and 8 are connected to a control device 27.

Preferably, the intake valves 22, the exhaust valves 23 and also the temperature sensor 21 are likewise connected to the control device 27.

Moreover, the traction device comprises an electrical heating means 28 for heating the treatment device 18. In the example illustrated, the treatment device 18 comprises a heating grid 28 arranged so as to face a monolith 29 of the treatment device 18.

The temperature T of the combustion gas treatment device is compared with the actuating threshold temperature $T_s$.

The temperature of the catalyst is generally below its actuating threshold temperature when the engine 1 is cold, which is particularly the case during starting and during the first seconds of operation thereof.

When the temperature T of the combustion gas treatment device 18 is below its actuating threshold temperature $T_s$, in a step 30, the heating means of the treatment device is activated and the supply of fuel into one or more of the cylinders 2, 3 and 4 is cut.

On the other hand, the operation of the intake valves 22 and exhaust valves 23 is kept unchanged and the valves open and close according to a normal operation of the engine.

In the example illustrated, the heating means 28 is activated by the control device 27, which cuts the injection of fuel into one of the cylinders, namely the cylinder 2.

Preferably, with regard in the example illustrated to a controlled-ignition engine, there is also cut the ignition of the spark plugs in the cylinders where the injection of fuel is cut. Only the opening and the closing of the intake valves 22 and exhaust valves 23 continue to operate normally.

In this configuration, the air 10 injected into the intake duct 11 passes, via the cylinder 2, toward the exhaust duct 14 when the intake valves 22 and exhaust valves 23 open according to a normal operation of the engine. The air can then be directed toward the treatment device 18.

The supply of fuel to all the cylinders 2, 3, 4 is re-established when the treatment device 18 reaches its actuating threshold temperature, from which it efficiently treats the polluting emissions of the engine 1.

Of course, it is possible to cut the supply of fuel into a plurality of the cylinders 2, 3, 4.

The opening of the intake valves 22 and exhaust valves 23 of the cylinders not supplied with fuel thus allows the air to pass toward the treatment device 18. This increase in the air flow and its contact with the heating means 18 have the consequence of promoting the heat exchanges between the heating means 28, here a heating grid, and the catalyst monolith 18, which leads to a quicker increase in the temperature of the treatment device 18. The treatment device 18, in particular the monolith, more rapidly reaches its actuating threshold temperature $T_s$, and the production of hydrocarbons is reduced. This results in a reduced emission of the pollutant gases.

The increase in the air flow in the treatment device 18 is thus produced without modification of the traction device nor incorporation of an additional element. In addition, the control method according to the invention is applicable both to direct-injection engines and to indirect injection engines.

Moreover, there may be provision for the control device 27 to be able to control the percentage of opening of the intake valves 22 and exhaust valves 23 of the cylinders 2, 3, 4 in which the supply of fuel is cut. In this way, the valves 22, 23 may be opened either totally or partially.

Moreover, the control device 27 can be configured to control the stopping of the supply of fuel into one or more of the cylinders as a function of a torque setpoint of the traction device.

For that purpose, the control device 27 calculates the torque setpoint of the traction device as a function of the speed of the traction device and of the depression of an accelerator pedal, which are determined beforehand.

In the case of a hybrid motor vehicle, the control device 27 may also be configured to control the distribution of the torque of the traction device to be supplied between an electric motor and the internal combustion engine when the temperature of the treatment device is below the actuating threshold temperature.

For example, the control device 27 cuts the supply of fuel into all the cylinders 2, 3, 4 of the internal combustion engine 1 and the whole of the torque of the traction device is supplied by the electric motor when the temperature of the treatment device is below the actuating threshold temperature.

The electric motor operates alone as long as the treatment device 18 is not active and capable of treating the pollutants emitted by the internal combustion engine in operation, and the torque of the traction device is ensured without emission of pollutants.

In addition, there may be provision for the control device 27 to determine the difference between the temperature T of the treatment device and the actuating threshold temperature $T_s$ and to distribute the torque of the traction device to be supplied respectively by the electric motor and the internal combustion engine as a function of the determined temperature difference.

For example, the more the temperature T of the treatment device 18 approaches its actuating threshold temperature $T_s$, that is to say the more the determined temperature difference decreases, then the more the torque to be supplied by the traction device will be assigned by the control device 27 to the internal combustion engine 1, which progressively re-establishes the injection of fuel into the plurality of cylinders 2, 3, 4. The internal combustion engine 1 then starts progressively with a thus minimized emission of pollutants.

There can also be provision for the control method described above to be implemented on an engine other than a motor vehicle engine.

The invention claimed is:

1. A control method comprising:
   controlling a traction device for a motor vehicle comprising an internal combustion engine and a treatment device for the combustion gases that is active from an actuating temperature, where the internal combustion engine includes a plurality of cylinders that are each provided with at least one air intake valve and at least one exhaust valve, and with a fuel injector, the treatment device being placed downstream of the exhaust valve, the traction device comprising an electrical heater for heating the combustion gas treatment device and a control device, the control method further comprising
   comparing a temperature of the combustion gas treatment device with an actuating threshold temperature using the control device, and
   actuating the electrical heater and stopping a fuel supply being supplied to one or more of the cylinders using the control device during operation of the internal combustion engine as long as the temperature of the combustion gas treatment device is below the actuating threshold temperature.

2. The control method as claimed in claim 1, further comprising
   determining a speed of the traction device and a depression of an accelerator pedal using the control device;

calculating of a torque setpoint of the traction device as a function of the speed of the traction device and of the depression of the pedal that were determined using the control device; and controlling the stopping of the fuel supply to one or more of the cylinders as a function of the torque setpoint of the traction device that was calculated using the control device.

3. The control method as claimed in claim 1, further comprising controlling a percentage of opening of the intake valves and the exhaust valves of the cylinders in which the fuel supply is stopped using the control device.

4. The control method as claimed in claim 1, further comprising controlling a distribution of torque to be supplied between an electric motor of the traction device and the internal combustion engine upon determining the temperature of the treatment device is below the actuating threshold temperature.

5. The control method as claimed in claim 4, wherein the control device stops the fuel supply into all of the cylinders of the internal combustion engine, and supplies all of the torque of the traction device from the electric motor upon determining the temperature of the treatment device is below the actuating threshold temperature.

6. The control method as claimed in claim 4, further comprising determining by the control device a difference between the temperature of the combustion gas treatment device and the actuating threshold temperature and a distribution of the torque of the traction device to be supplied respectively by the electric motor and the internal combustion engine as a function of the difference that was determined.

7. A traction device for a motor vehicle comprising an internal combustion engine and a treatment device for the combustion gases that is active from an actuating temperature, where the internal combustion engine includes a plurality of cylinders that are each provided with at least one air intake valve and at least one exhaust valve, and a fuel injector, the combustion gas treatment device being placed downstream of the exhaust valve, the traction device comprising:

an electrical heater for heating the combustion gas treatment device; and a temperature sensor configured to record the temperature of the combustion gas treatment device; and a control device configured to activate the electrical heater and stop a fuel supply into one or more of the cylinders of the internal combustion engine during operation of the internal combustion engine as long as the temperature of the combustion gas treatment device is below an actuating threshold temperature.

8. The traction device as claimed in claim 7, wherein the control device is configured to:

determine a speed of the traction device and a depression of an accelerator pedal;

calculate a torque setpoint of the traction device as a function of the speed and the depression that were determined; and control the stopping of the fuel supply into one or more of the cylinders as a function of the torque setpoint of the traction device that was calculated.

9. The traction device as claimed in claim 7, wherein the control device is configured to control a percentage of opening of the intake valves and the exhaust valves of the cylinders in which the fuel supply is stopped.

10. The traction device as claimed in claim 7, further comprises an electric motor, and the control device being configured to control traction of the motor vehicle at least in part by the electric motor as long as the temperature of the combustion gas treatment device is below the actuating threshold temperature.

11. The traction device as claimed in claim 10, wherein the control device is configured to stop the fuel supply in all of the cylinders of the internal combustion engine and to supply all of the torque of the traction device from the electric motor upon determining the temperature of the combustion treatment device is below the actuating threshold temperature.

12. The traction device as claimed in claim 10, wherein the control device is configured to determine a difference between the temperature of the combustion gas treatment device and the actuating threshold temperature and determine a distribution of the torque to be supplied respectively by the electric motor and the internal combustion engine as a function of the difference that was determined.

13. A motor vehicle comprising the traction device as claimed in claim 7.

* * * * *